United States Patent
Stark et al.

[11] Patent Number: 6,157,189
[45] Date of Patent: Dec. 5, 2000

[54] MAGNETIC READ/WRITE OF REFERENCE TRACK IN CONTACT START-STOP TESTING OF MAGNETIC DISKS

[75] Inventors: Dennis C. Stark; Yuriy Belov; Edmond Sardariani, all of Santa Clara County, Calif.

[73] Assignee: Intevac, Inc., Santa Clara, Calif.

[21] Appl. No.: 09/046,407

[22] Filed: Mar. 23, 1998

[51] Int. Cl.[7] .......................... G01R 33/12; G01B 27/36; G01B 5/455

[52] U.S. Cl. .............................. 324/212; 369/53

[58] Field of Search .................... 424/210, 212; 360/6, 25, 31; 369/53, 55, 58

[56] References Cited

U.S. PATENT DOCUMENTS

| | | | |
|---|---|---|---|
| 4,896,227 | 1/1990 | Fountain et al. | 324/212 |
| 4,904,938 | 2/1990 | O'Reilly et al. | 324/212 |
| 5,256,965 | 10/1993 | Nomura | 324/212 |
| 5,280,395 | 1/1994 | Matsuzaki | 324/212 X |
| 5,532,586 | 7/1996 | Ishikawa | 324/212 |
| 5,838,153 | 11/1998 | Inbar | 324/212 |
| 5,838,510 | 11/1998 | Inbar | 324/212 X |

OTHER PUBLICATIONS

Kanu G. Ashar. Magnetic Disk Drive Technology: Heads, Media, Channel, Interfaces, and Integration. IEEE Press, 1997, pp. 44–54.

*Primary Examiner*—Gerard Strecker
*Attorney, Agent, or Firm*—Stanley Z. Cole

[57] ABSTRACT

Methods and apparatus for testing a magnetic disk and a read head are provided. A reference track is written on the magnetic disk. The read head is scanned laterally with respect to the reference track while the magnetic disk is rotating. The reference track is sensed with the read head as the read head is scanned across the reference track to produce a scanned read signal that is representative of disk and read head performance. The scanned read signal may be processed to provide parameters such as track average amplitude, signal-to-noise ratio, and pulse width of write transitions.

21 Claims, 3 Drawing Sheets

MAGNETIC READ/WRITE OF REFERENCE TRACK IN CONTACT START-STOP TESTING OF MAGNETIC DISKS

FIELD OF THE INVENTION

This invention relates to testing of the head/disk interface in magnetic disk drives and, more particularly, to contact start-stop testing of magnetic disks used in disk drives. The testing involves writing and subsequent reading of a reference track.

BACKGROUND OF THE INVENTION

Test equipment has been developed to study the operation and performance of magnetic disk drives. Contact start-stop (CSS) testing traditionally uses force and acoustic data to study the characteristics and durability of the head/disk interface in disk drives. One of the purposes of this testing is to estimate the expected error rate of information written on the disk. The error rate is estimated by inference and extrapolation of the CSS force and acoustic data rather than from direct measurement.

As the read/write head moves over a disk surface, both the head and the disk wear, creating a variety of problems. The wear affects the error rate of data written on the disk surface and ultimately affects the lifetime of the disk drive. One of the most important purposes of CSS testing is to determine the increase in error rate with wear. The most direct way to accomplish this would be to write a data track, conduct the CSS test and compare the error rates on the written track before and after the test. However, CSS testing is conducted on disks which do not contain the servo track information that is later incorporated into disks to allow the read/write head to return to a previously written track. Without a servo track, the head cannot be positioned with the accuracy required to obtain a valid read signal. Therefore, it has not been possible to incorporate read/write testing into CSS wear testing without the use of extremely expensive micropositioning equipment.

Existing CSS testers can write a data track and then immediately read the data track while the read/write head is still aligned over the written track. After a short period of time, the signal is permanently lost due to movement of the read head because of environmental effects, such as vibration and temperature changes, or because of deliberate movement of the head as a part of common CSS tests protocols. Since CSS testers cannot return to read a previously written track, the degradation of the previously written data as a function of wear cannot accurately be determined. Because of this, existing CSS testers must write a new track after seek or sweep movements, and cannot directly determine the effect of wear on previously written data.

The inability of existing CSS testers to return to and recover data from a previously written track causes such testers to have significant limitations. A data track cannot be written and later accurately read in an area of the disk which does not undergo CSS wear testing. Writing and then reading back the information immediately thereafter can introduce potentially large variations in the read signal due to vibration of the head and/or flexure, and the fact that the data was written at a slightly different radial location. Accordingly, there is a need for testing methods and apparatus which overcome one or more of the above described drawbacks and disadvantages.

SUMMARY OF THE INVENTION

According to a first aspect of the invention, a method for testing a magnetic disk and a read head is provided. The method comprises the steps of writing a reference track on a magnetic disk, rotating the magnetic disk about a central axis and scanning the read head laterally with respect to the reference track while the magnetic disk is rotating. The reference track is sensed with the read head as the read head is scanned across the reference track and produces a scanned read signal that is representative of disk and read head performance.

Peaks of the scanned read signal may be detected to provide a peak read signal. The peak read signal values may be averaged over time to provide a signal representative of the track average amplitude (TAA).

The read head is preferably scanned between a radius that is larger than the radius of the reference track and a radius that is smaller than the radius of the reference track in response to a periodic waveform.

A first reference track may be written in a first area of the magnetic disk, and a second reference track may be written in a second area of the magnetic disk. The read head scans the first reference track and scans the second reference track. The first and second reference tracks are sensed and produce first and second scanned read signals, respectively, that are representative of disk and read head performance. The first and second areas may be in used and unused areas, respectively, of the magnetic disk. The first and second scanned read signals may be compared to distinguish degradation of the disk surface from degradation of the read head.

The steps of scanning the read head, sensing the reference track and producing a scanned read signal may be repeated one or more times to assess degradation of the magnetic disk and the read head.

The read head may be scanned laterally with respect to an erased track on the magnetic disk. The erased track is sensed with the read head and produces an erased track signal. The scanned read signal and the erased track signal are representative of signal-to-noise ratio of the magnetic disk.

According to another aspect of the invention, apparatus for testing a magnetic disk and a read head is provided. The apparatus comprises a write head for writing a reference track on the magnetic disk, a mechanism for rotating the magnetic disk and a read head for reading information on the magnetic disk. The apparatus further comprises a scanner for scanning the read head laterally with respect to the reference track as the magnetic disk is rotated so that the read head crosses the reference track. The read head senses the reference track and produces a scanned read signal that is representative of disk and read head performance. The apparatus may further comprise a sensing circuit for processing the scanned read signal to provide at least one parameter that is representative of disk and read head performance.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
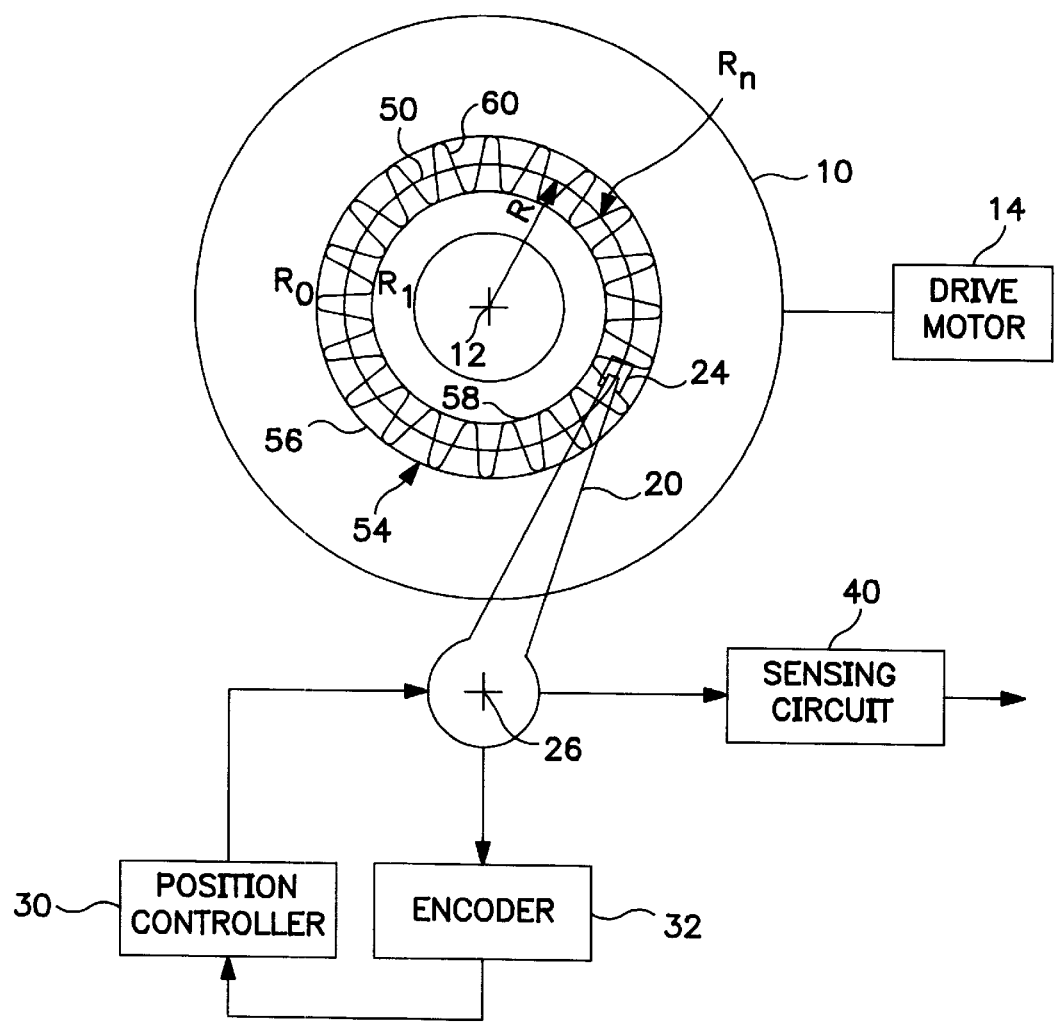
FIG. 1 is a schematic block diagram of an example of testing apparatus in accordance with the invention.

A block diagram of an example of testing apparatus in accordance with the invention is shown in FIG. 1. A magnetic disk 10 is rotated about a central axis 12 by a drive motor 14. A read/write head 20 is positioned for reading and writing data on magnetic disk 10. Read/write element 24 may be positioned at different radial positions on disk 10 by rotation of head 20 about an axis 26. Read/write head 20 may, for example, be positioned by a voice coil actuator (not shown). The radial position of read/write element 24 is controlled by a position controller 30, which supplies a control signal to the voice coil actuator. The angular position of read/write head 20 may be sensed by an encoder 32. The output of encoder 32 may be supplied to position controller 30 to establish a feedback loop for accurate position control. The output of the read element of read/write head 20 is supplied to a sensing circuit 40.

According to an aspect of the invention, a reference track 50 is written on magnetic disk 10 using read/write head 20 or another write head. The reference track 50 may contain any desired data pattern and is written at a selected radius $R_n$ on disk 10. As described below, more than one reference track may be written on magnetic disk 10. The testing apparatus then reads the reference track 50 by scanning read/write element 24 laterally with respect to reference track 50. A scanning pattern is selected such that read/write element 24 repeatedly crosses reference track 50. A scanned annular band 54 having an outside radius 56 greater than the radius of reference track 50 and an inside radius 58 less than the radius of reference track 50 is scanned. The size of annular band 54 is selected to ensure that reference track 50 remains within the scanned band 54 under worst case mechanical and environmental conditions.

The scanning of read/write head 20 with respect to reference track 50 is controlled by position controller 30. An example of a scan pattern is represented by scan path 60 in FIG. 1. The scan path is preferably periodic and may, for example, be sinusoidal, a sawtooth wave or a square wave.

Figure 2:
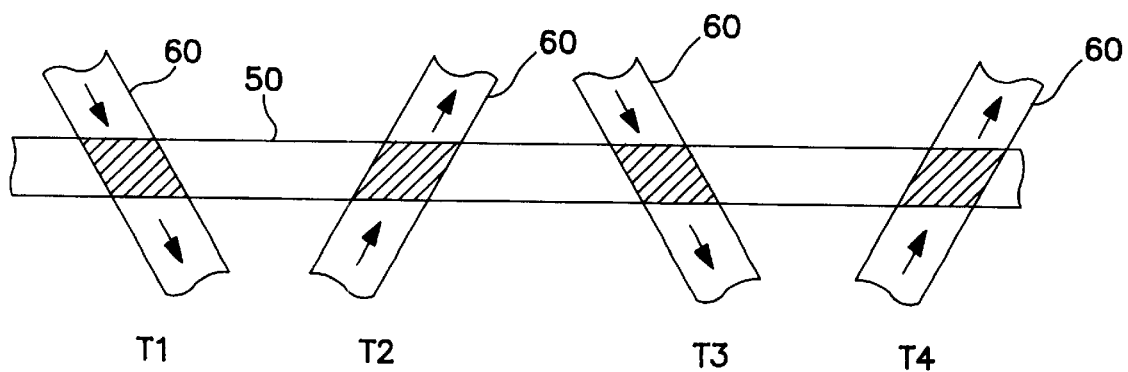
FIG. 2 is an enlarged, partial schematic diagram that illustrates scanning of a reference track in accordance with the invention.
Figure 4:
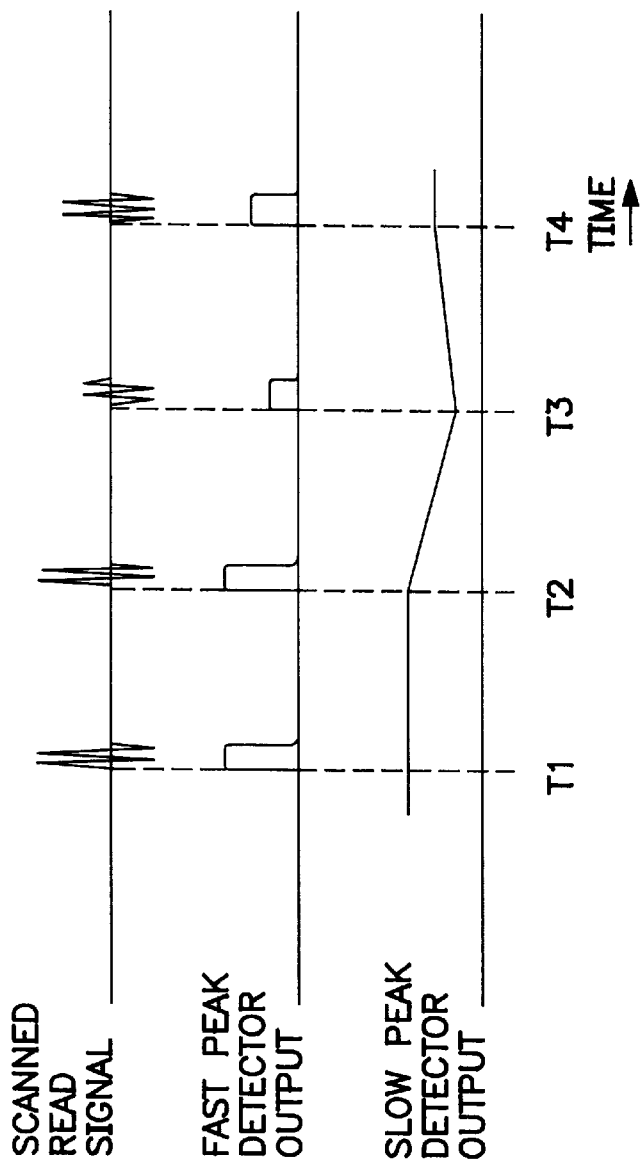
FIG. 4 illustrates waveforms associated with the testing apparatus of the present invention.

An enlarged view of a portion of reference track 50 and portions of scan path 60 is shown in FIG. 2. Scan path 60 represents the path followed by read/write element 24 in scanning reference track 50. A short segment of reference track 50 is approximated in FIG. 2 as a straight line. Reference track 50 is typically about 1–3 micrometers wide. As shown, scan path 60 crosses reference track 50 at times T1, T2, T3 and T4. At each crossing, the read head senses reference track 50 and produces a scanned read signal. As shown in FIG. 4, the scanned read signal occurs at times T1, T2, T3 and T4 corresponding to crossings of the reference track 50 by the read head. The scanned read signal is representative of the performance of the magnetic disk and the read/write head 20.

Preferably, read/write head 20 is scanned over reference track 50 at a frequency in a range of about 10 Hz to 30 Hz using a triangular waveform. The scan amplitude typically may be about ±0.003 inch.

Figure 3:
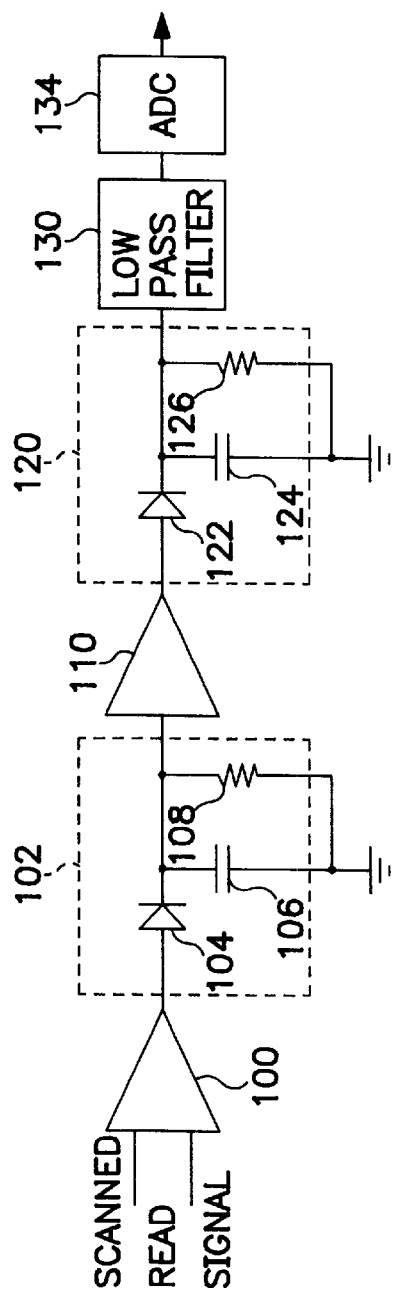
FIG. 3 is a block diagram of an example of the sensing circuit of FIG. 1.

An example of sensing circuit 40 is shown in FIG. 3. The output of read head 20 is coupled to a preamplifier 100. The output of preamplifier 100 is supplied to a fast peak detector 102 which includes a diode 104, a capacitor 106 and a resistor 108 in a conventional peak detector configuration. The capacitor 106 and resistor 108 have relatively small values to provide fast peak detection. As shown in FIG. 4, the fast peak detector 102 detects the amplified scanned read signal and provides a pulse each time the read head crosses the reference track 50. The output of fast peak detector 102 is supplied through an amplifier 110 to a slow peak detector 120, which includes a diode 122, a capacitor 124 and a resistor 126. The values of capacitors 124 and resistor 126 are relatively large to provide slow peak detection. As shown in FIG. 4, the output of slow peak detector 120 is a relatively slowly varying voltage that follows the peaks of the pulses output by fast peak detector 102. The output of slow peak detector 120 is filtered by a lowpass filter 130 and is digitized by an analog-to-digital converter 134. The output of analog-to-digital converter 134 is representative of track average amplitude (TM) and may be displayed and/or recorded by a computer or other suitable instrument. By averaging the output of analog-to-digital converter 134 over many rotations of disk 10, the track average amplitude is determined with great accuracy.

The testing apparatus described above may be used to determine the signal-to-noise ratio of the disk and the read head. A second reference track is written on disk 10 at a different location from reference track 50 and is subsequently erased. Then, the noise from the erased track is measured by scanning as described above. The ratio of track average amplitude measured on reference track 50 to noise measured on the erased reference track is indicative of signal-to-noise ratio.

In accordance with another testing technique, multiple reference tracks may be written in tested and untested areas of disk 10. The reference tracks are then scanned as described above. Differences between the scanned read signals in tested and untested areas permit degradation of the disk surface to be distinguished from degradation of the read head.

Figure 5:
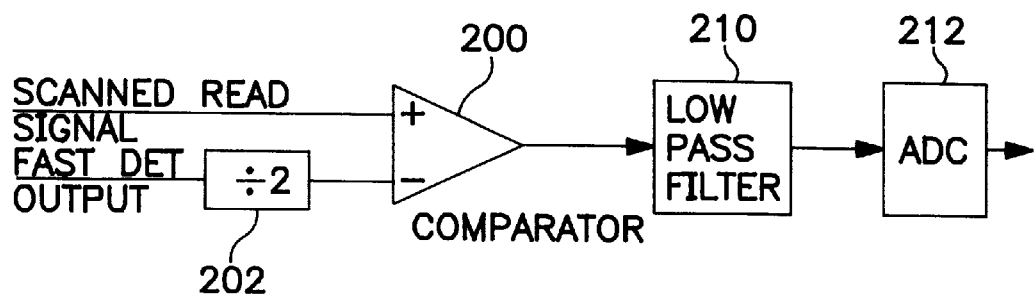
FIG. 5 is a block diagram of an example of a circuit for determining pulse width.

An example of a circuit for determining the average width of write transitions around the reference track is shown in FIG. 5. The scanned read signal is supplied to a first input of a comparator 200. The output of fast peak detector 102 (FIG. 3) is supplied through a divide-by-two circuit 202, such as a resistive divider, to a second input of comparator 200. The output of comparator 200 is filtered in a lowpass filter 210 and is digitized in an analog-to-digital converter 212. The output of analog-to-digital converter 212 is representative of the average width of all pulses on the reference track measured at 50% of the pulses' height.

The testing apparatus and methods described above provide a number of advantages. Very accurate track average amplitude measurements can be made in a CSS test environment on a disk which does not contain a servo track. In addition, signal-to-noise ratio and pulse width can be determined as described above. Degradation of the disk surface may be distinguished from degradation of the read head by reading reference tracks in tested and untested areas. Precision track parametric measurements can be made on non-precision mechanical systems which do not require temperature compensation, expensive air-bearing spindles and micropositioning systems. Accurate measurements can be made on arbitrarily small track widths. Measurements can be made with inductive, MR (magneto-resistive) or GMR (giant magneto-resistive) technologies.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A method for testing a magnetic disk and a read head, comprising the steps of:

writing an arbitrary signal on a reference track located at an arbitrarily selected radial distance from the center of the magnetic disk in test using a magnetic recording read/write head;

rotating the disk around its central axis during testing;

scanning the magnetic disk with the magnetic read/write head by moving the head laterally back and forth repeatedly crossing the reference track on said disk a plurality of times to scan a zone which is radially larger and radially shorter than the radial distance from the center of the disk to the recording track on the disk as the magnetic disk is rotating around its central axis; and sensing the arbitrary signal on the reference track as the read/write head is scanned back and forth across the reference track in the zone being scanned producing a scanned read signal that is representative of the magnetic disk and read/write head performance.

2. A method for testing a magnetic disk and a read head as defined in claim 1 further including the step of detecting peaks of the scanned read signal to provide a peak read signal.

3. A method for testing a magnetic disk and a read head as defined in claim 2 further comprising the step of averaging said peak read signal to provide an average signal representative of track average amplitude.

4. A method for testing a magnetic disk and a read head as defined in claim 1 wherein the step of scanning a zone comprises moving said read head in a scan path in the shape of a periodic waveform.

5. A method for testing a magnetic disk and a read head as defined in claim 1 wherein the step of writing a reference track includes writing a first reference track in a first area of the magnetic disk and writing a second reference track in a second area of the magnetic disk, wherein the step of scanning a read head includes scanning the first reference track and scanning the second reference track, and wherein the step of sensing the reference track includes sensing the first and second reference tracks and producing first and second scanned read signals that are representative of disk and read head performance.

6. A method for testing a magnetic disk and a read head as defined in claim 5 wherein said first and second areas are in areas of the disk that have been used for writing and areas of the disk that are clean of written information, respectively, and further comprising the step of comparing the first and second scanned read signals to distinguish degradation of the disk surface from degradation of the read head.

7. A method for testing a magnetic disk and a read head as defined in claim 1 wherein the steps of scanning a read head, sensing the reference track and producing a scanned read signal are repeated one or more times to assess degradation of the magnetic disk and the read head.

8. A method for testing a magnetic disk and a read head as defined in claim 1 further comprising the steps of scanning the read head laterally with respect to an erased track on the magnetic disk, sensing the erased track with the read head and producing an erased track signal, wherein said scanned read signal and said erased track signal are representative of signal-to-noise ratio of the magnetic disk.

9. A method for testing a magnetic disk and a read head as defined in claim 1 wherein the step of scanning the read head laterally with respect to the reference track is performed such that the read head crosses the reference track at a rate of about 100 Hz or greater.

10. A method for testing a magnetic disk and a read head as defined in claim 1 further including the step of determining the average width of write transitions of the reference track from said scanned read signal.

11. Apparatus for testing a magnetic disk and a read head, comprising:

a write head for writing a user defined signal on a reference track located on the magnetic disk at an arbitrary radial distance from the center of the magnetic disk using a magnetic recording head;

a mechanism for rotating the magnetic disk around its center;

a read head for reading information on the magnetic disk; and a scanner for laterally scanning the read head back and forth across a scan zone including said reference track, said scan zone comprising a concentric circular zone on said magnetic disk with an outer radial circle larger than a circle defined by a radius from said reference track to the center of the disk and an inner radial circle shorter than a circle area defined by a radius from said reference track to the center of the disk, so that the read head crosses the arbitrary location of said reference track in said zone on the magnetic disk a plurality of times and wherein the read head senses a signal of the reference track during scanning of the disk.

12. Apparatus as defined in claim 11 further comprising a sensing circuit for processing said scanned read signal and producing an output signal representative of disk and read head performance.

13. Apparatus as defined in claim 12 wherein said sensing circuit comprises a peak detector for detecting peaks of the scanned read signal to provide a peak read signal.

14. Apparatus as defined in claim 13 further comprising an averaging circuit for averaging said peak read signal to provide an average signal representative of track average amplitude.

15. Apparatus as defined in claim 11 wherein said scanner comprises means for scanning the read head between a radius that is larger than the radius of the reference track and a radius that is smaller than the radius of the reference track in response to a periodic waveform.

16. Apparatus as defined in claim 11 wherein said write head includes means for writing a first reference track in a first area of the magnetic disk and means for writing a second reference track in a second area of the magnetic disk, wherein said scanner includes means for scanning the first reference track and means for scanning the second reference track, and wherein the read head senses the first and second reference tracks and produces first and second scanned read signals that are representative of disk and read head performance.

17. Apparatus as defined in claim 16 wherein said first and second areas are in areas of the disk that have been used for writing and areas of the disk that are clean of written information, respectively, said apparatus further comprising means for comparing said first and second scanned read signals to distinguish degradation of the disk surface from degradation of the read head.

18. Apparatus as defined in claim 11 wherein said scanner includes means for scanning the read head laterally with respect to an erased track on the magnetic disk, wherein the read head senses the erased track and produces an erased track signal, and wherein said scanned read signal and said erased track signal are representative of signal-to-noise ratio of the magnetic disk.

19. Apparatus as defined in claim 12 wherein said sensing circuit includes a fast peak detector for detecting peaks of the scanned read signal to provide a peak read signal and a slow peak detector for detecting peaks of the peak read signal to provide an average signal representative of track average amplitude.

20. Apparatus as defined in claim 19 further comprising a low pass filter for filtering the average signal and an analog-to-digital converter for digitizing the filtered average signal to provide a digital signal representative of track average amplitude.

21. Apparatus as defined in claim 12 wherein said sensing circuit includes means for determining the average width of write transitions of the reference track from said scanned read signal.

* * * * *